(12) United States Patent
Wang

(10) Patent No.: US 12,450,566 B1
(45) Date of Patent: Oct. 21, 2025

(54) SYSTEMS AND METHODS FOR CREATION OF ADMINISTRATIVE SYSTEMS

(71) Applicant: DataInfoCom USA Inc, Austin, TX (US)

(72) Inventor: Wensu Wang, Katy, TX (US)

(73) Assignee: DataInfoCom USA, Inc., Austin, TX (US)

( * ) Notice: Subject to any disclaimer, the term of this patent is extended or adjusted under 35 U.S.C. 154(b) by 834 days.

(21) Appl. No.: 17/687,632

(22) Filed: Mar. 5, 2022

Related U.S. Application Data

(63) Continuation-in-part of application No. 17/107,873, filed on Nov. 30, 2020.

(60) Provisional application No. 62/976,191, filed on Feb. 13, 2020.

(51) Int. Cl.
*G06Q 10/10* (2023.01)
*G06N 5/02* (2023.01)

(52) U.S. Cl.
CPC ............ *G06Q 10/103* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 6,151,608 A | 11/2000 | Abrams | |
| 9,996,799 B2 * | 6/2018 | Bostick | G06N 5/025 |
| 10,346,454 B2 * | 7/2019 | Moeller-Bertram | G06F 18/2113 |
| 11,086,549 B2 | 8/2021 | Ramakrishnan et al. | |
| 11,790,262 B2 * | 10/2023 | Ghatage | G06N 20/00 706/12 |
| 2002/0138449 A1 | 9/2002 | Kendall et al. | |
| 2003/0041059 A1 | 2/2003 | Lepien | |
| 2007/0288535 A1 | 12/2007 | Shitomi et al. | |
| 2009/0119476 A1 | 5/2009 | Jernigan et al. | |
| 2013/0132285 A1 | 5/2013 | Richards et al. | |
| 2015/0019476 A1 | 1/2015 | Hiatt et al. | |
| 2015/0019488 A1 | 1/2015 | Higginson et al. | |
| 2017/0352041 A1 | 12/2017 | Ramamurthy et al. | |
| 2018/0322396 A1 | 11/2018 | Ahuja-Cogny et al. | |
| 2019/0065523 A1 | 2/2019 | Singh et al. | |
| 2019/0197171 A1 | 6/2019 | Tiwari et al. | |
| 2020/0012970 A1 | 1/2020 | Srivastava et al. | |
| 2020/0257540 A1 | 8/2020 | Moreno et al. | |

OTHER PUBLICATIONS

U.S. Appl. No. 17/110,247, filed Dec. 2, 2020 (Wang).
U.S. Appl. No. 17/107,873, filed Nov. 30, 2020 (Wang).
U.S. Appl. No. 17/715,729, filed Apr. 7, 2022 (wang).

\* cited by examiner

*Primary Examiner* — Scott S Trotter
(74) *Attorney, Agent, or Firm* — Chad Peterson

(57) ABSTRACT

Methods, systems and apparatuses, including computer programs encoded on computer storage media, are provided for automatically creating a virtual administrative system based on one or more legacy administrative systems. The data definitions, product rules, business functions/processes, business rules, and calculation modules of the legacy system and the integrated system are analyzed by an analysis system to determine elements in the legacy system and not in the integrated system. Elements of the legacy system not present in the integrated system are generated in the integrated system.

20 Claims, 8 Drawing Sheets

SYSTEMS AND METHODS FOR CREATION OF ADMINISTRATIVE SYSTEMS

CROSS-REFERENCE TO RELATED APPLICATIONS

The present application is a continuation-in-part of U.S. patent application Ser. No. 17/107,873, entitled "SYSTEMS AND METHODS FOR AUTOMATING ADMINISTRATIVE SYSTEM PROCESSES," filed Nov. 30, 2020, and claims the benefit of U.S. Provisional Patent Application No. 62/976,191, entitled "SYSTEMS AND METHODS FOR AUTOMATING ADMINISTRATIVE SYSTEM PROCESSES," filed Feb. 13, 2020, each of which is incorporated by reference herein in its entirety.

BACKGROUND

This specification relates generally to Artificial Intelligence (AI) technologies as applied to the automated creation of administrative systems, such as insurance Policy Administration Systems (PAS), using the latest architectures and technologies. More specifically, this specification relates to automatic processes for creating a virtual administrative system that is based on one or more legacy administrative systems.

Currently, many businesses rely on cumbersome legacy administration systems with deprecated technologies, siloed and unscalable data structure, and manually intensive processes that are error-prone and difficult to scale. Businesses may want to convert their legacy administration systems to an integrated administration system that meets business requirements. Such an integrated system is more flexible, expandable, adaptable, repeatable, and scalable as compared to legacy systems.

SUMMARY

In accordance with the foregoing objectives and others, exemplary methods and systems are disclosed herein to create an integrated administration system. Such methods and systems include incorporating existing items, such as products, processes, procedures, business rules, calculation modules, and/or data structures, from one or more legacy administration systems into an integrated administration system using the latest data-driven architectures and AI-empowered technologies.

One embodiment is directed to a method for implementing a legacy administration system into an integrated administration system, the method comprising: analyzing the legacy system using an analysis system to determine its components, including but not limited to, data items, product rules, business functions or processes, and calculation modules; identifying at least one data item required by the legacy system not present in the integrated system using one or more AI techniques; implementing the identified data item into the integrated system; identifying at least one functionality required by the legacy system and not present in the integrated system using one or more AI techniques; and implementing the identified functionality into the integrated system.

Another embodiment is directed to a system for creation of an integrated administration system, the system comprising: an analysis system adapted to analyze an administrative system to determine its components, including but not limited to, data definitions, product rules, business processes, and calculation modules; a product conversion system adapted to convert at least one product from a legacy administrative system to a virtual administrative system; a data definition conversion system adapted to convert at least one data definition in the legacy administrative system to the virtual administrative system in accordance with the data definitions of the integrated system; and a function conversion system adapted to convert at least one functionality in the legacy administrative system to the virtual administrative system.

Another embodiment is directed to a method for creating an integrated administration system from more than one legacy administration system, the method comprising: for each legacy system: analyzing the legacy system using an analysis system to determine its components, including but not limited to, data items, products, product rules, business functions or processes, and calculation modules; implementing all identified functionality, including business functions, business processes, and calculation modules, into the integrated system; implementing all identified products and product rules into the integrated system; and migrating all identified data items to the integrated system; wherein the final integrated administration system comprises at least two siloed migrated legacy systems.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
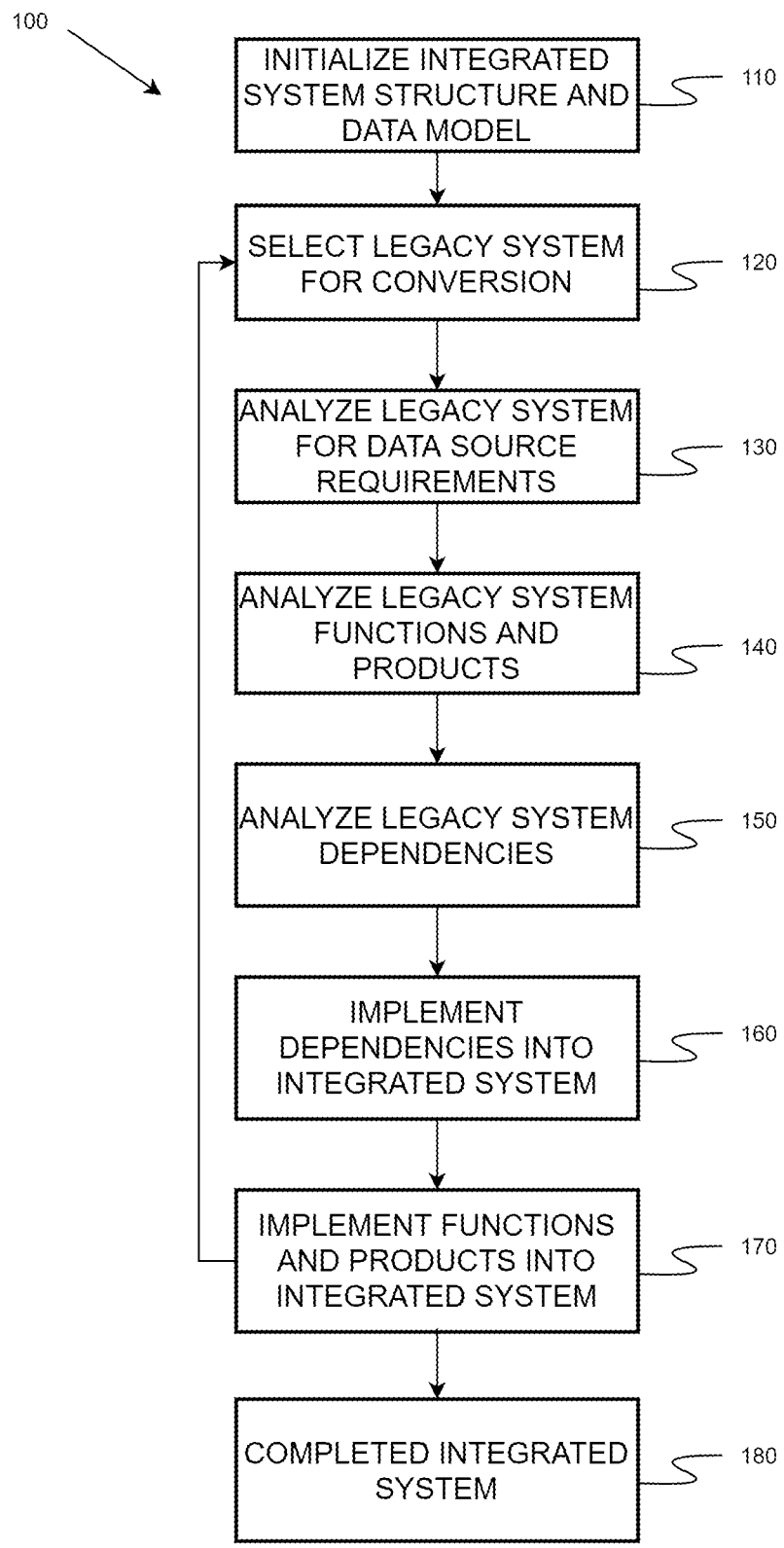
FIG. 1 illustrates an example method for the creation of an integrated administration system.

Systems and methods are disclosed herein for the creation of an integrated administration system from one or more legacy administration systems, e.g., ALIS, InsPro, DXC Cyberlife, DXC Graphtalk, DXC Ingenium, iWorks, etc. The disclosed systems and methods enable a user to create an integrated administration system based on the products, policies, processes, business functions, data definitions, data items, and any other elements of the legacy administration systems using various artificial intelligence (AI) and robotic process automation (RPA) techniques. AI techniques include, but are not limited to, machine learning (ML), deep learning, natural language processing (NLP) (including information extraction (IE)), natural language understanding (NLU), natural language generation (NLG), computer vision, speech recognition, signal processing, etc. Robotic process automation refers to the automation of repetitive tasks, thereby making the process less labor-intensive for humans.

AI models include one or more of the following: classification models, regression models, Markov chains, time series models, state space models, Bayesian models, decision trees (including boosted decision trees), neural networks, deep neural networks, convolutional neural networks, recurrent neural networks, long short term memory (LSTM) neural networks, kNN models, Prophet models, support vector machines, or any other appropriate supervised or unsupervised model, or combinations or ensembles (e.g., by bagging, boosting, random forest techniques) thereof. To train an AI model, the system will generally use a set of historical data, including input variables and a target. Multiple models with different hyperparameters may be created and evaluated to select a preferred model. In one embodiment, a hyperparameter autotuning system may be used to create, test, and select preferred models. Any created models may be periodically retrained using additional historical data and/or an evaluation of the outputs or predictions of the models to be retrained. Additionally, it also includes the latest developed types of the AI technologies, such as transfer learning, semi-supervised, graph neural network, probabilistic machine learning.

Natural language generation (NLG) refers to AI techniques for generating human-readable text from structured data. Such techniques include, but are not limited to, template-based text generation, trained NLG models, etc.

Natural language processing (NLP), natural language understanding (NLU), and natural language information extraction (IE) refer to AI techniques for extracting data from text and making comparisons between texts. These techniques include a set of natural language processing algorithms, including but not limited to, tokenization, word stemming, grammar analysis, bagging of words, term frequency-inverse document frequency (TF-IDF), latent dirichlet allocation (LDA), topic modeling, sentiment analysis, semantic analysis (e.g., doc2vec, word2vec), keyword identification, bi-directional attention flow (Bi-DAF) or Transformer networks (e.g., BERT, ROBERTa), etc., to extract information from the text, convert it into a structured format, and make comparison or otherwise process the text.

The methods and systems described herein enable the creation of an integrated administration system from one or more legacy administration system. FIG. 1 illustrates an example method 100 for creation of an integrated administration system from one or more legacy systems. In step 110, the initial structure and data model for the integrated administration system is created. This may include predefined templates for functions, processes, products, product rules, data items, and other elements.

In step 120, a legacy administration system is selected for conversion. The selected system may be an existing administrative system, e.g., ALIS, InsPro, DXC Cyberlife, DXC Graphtalk, DXC Ingenium, iWorks, etc.

In step 130, the data sources of the legacy system are analyzed to determine if the system meets data source requirements. Data sources include document that describe the system, and include system architecture documents, system manuals, source code, data dictionaries, transaction data, policy data documents, product data documents, and others. The legacy system data sources should have information about its functionality, processes, and products, as well as a data dictionary. These data source requirements are helpful for building a fully functional integrated system.

In step 140, the legacy system (and its data sources) is analyzed to determine its functionalities, including business functions, business rules, calculation modules, etc., and its products.

In step 150, the legacy system (and its data sources) is analyzed to determine the dependencies (e.g., data elements, data points, data structures, data definitions, other functionalities, etc.) of the legacy system's functions. In step 160, these dependencies are implemented in the integrated system if not already present.

In step 170, the functionalities and products determined in step 140 are implemented in the integrated system if not already present.

The method then loops to step 120 to select another legacy system for implementation into the integrated system, if any are remaining. If not, the method ends. The resulting integrated administration system 180 is adaptive to various needs, extensible through the addition of new functionalities and data definitions, scalable, and secure.

The methods and systems for the creation of an integrated administration system are useful for a wide range of insurance and investment products and product administration systems in other industries, including but not limited to, life insurance (term and whole), disability insurance, casualty insurance, income protection insurance, employment insurance, annuities, etc. These insurance/investment products involve similar types of systems related to policy administration. Such systems may include but not limited to, customer data, policy data, and processes such as altering (e.g., increasing or decreasing) insurance coverage, increasing or decreasing contributions (e.g., for an investment product), billing, receiving payments or contributions, making payments (e.g., paying out on a policy retirement date, benefit payments), processing claims, making inflation adjustments to benefits, sending various communications (e.g., annual statements, policy schedules, payment notices, etc.), calculating and paying agent commissions, calculating premiums, etc.

The methods and systems described herein are able to use and synthesize all available information related to the incorporation of the legacy systems into the integrated system, convert any relevant unstructured data into structured data, identify relevant insurance policy documents and extract relevant information from such documents, analyze the legacy system (and the integrated system when needed) to determine policies and products to migrate to the integrated system, analyze the products and policies to be migrated for any functionalities and/or data items required by those products and policies, identify functionality in the integrated system that matches functionality in the legacy system, identify data items in the integrated system that match data items in the legacy system, create new policies in the integrated system based on legacy policies, create new product rules in the integrated system based on legacy product rules, create new business rules in the integrated system based on legacy business rules, create new calculation modules in the integrated system based on legacy calculation modules, create new business functions in the integrated system based on legacy business functions, create new data items in the integrated system based on legacy data items, identify data items needed by any functionality in the legacy system but not yet implemented in the integrated system, etc.

Figure 2:
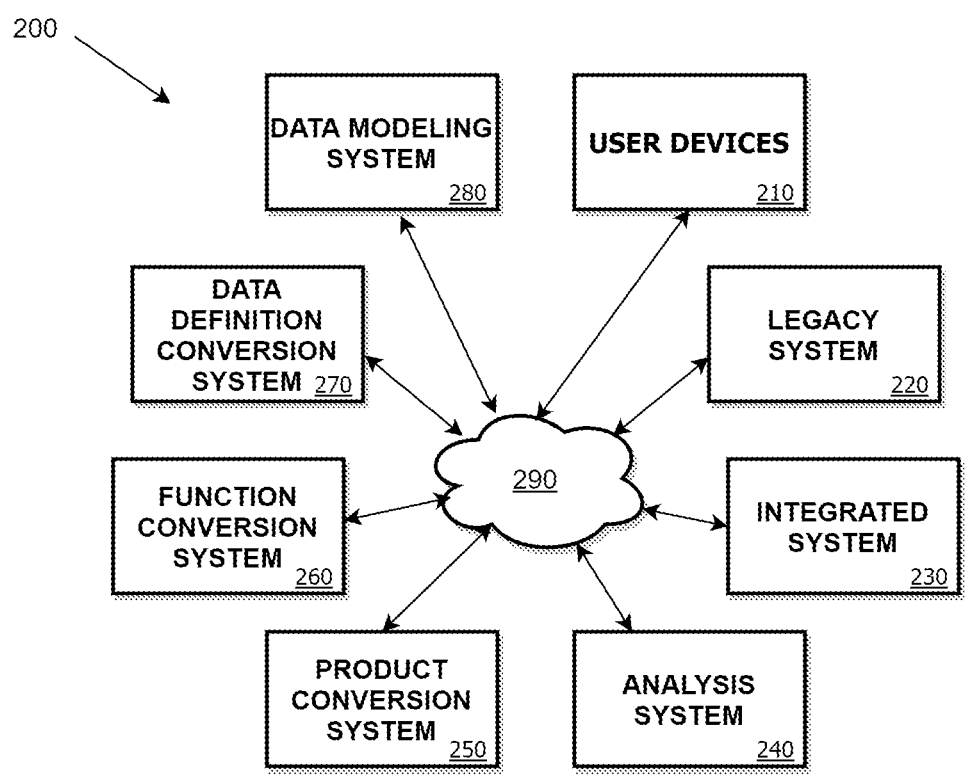
FIG. 2 is a block diagram of an example system for creating integrated administrative systems.

Referring to FIG. 2, a block diagram of an exemplary system 200 for use in creation of the integrated administration system is illustrated. The integrated administration creation system may include user devices 210, one or more legacy administration systems 220, an integrated administration system 230, an analysis system 240, a product conversion system 250, a function conversion system 260, a data definition conversion system 270, and a data modeling system 280. The system components may be remote from each other and interact through a communication network 290. Non-limiting examples of communication networks include local area networks (LANs), wide area networks (WANs) (e.g., the Internet), etc.

In certain embodiments, a user may access any of the other systems via a user device 210 connected to the network 290. A user device 210 may be any computer device capable of accessing any of the other systems, such as by running a client application or other software, like a web browser or web-browser-like application.

The analysis system 240 is adapted to analyze an administrative system (e.g., a PAS) to determine its specifications, including the system configuration, data structures, data definitions, data points, calculation modules, products, product rules, policies, business functions or rules, etc. The analysis system is also adapted to identify all dependencies of each functionality (e.g., calculation modules, business functions, business rules, etc.). Dependencies can include required data points, data structures, data definitions, and or other functionalities.

The analysis system may be configured to analyze data sources related to the administrative system to determine its specification. Such data sources include system architecture documents, system manuals, source code, data dictionaries, transaction data, policy data documents, product data documents, and others. To that end, the analysis system may be configured to use the information retrieval (IR) and information extraction (IE) techniques described in U.S. patent application Ser. No. 17/491,361, entitled "SYSTEMS AND METHODS FOR INFORMATION RETRIEVAL AND EXTRACTION," filed Sep. 30, 2021, which is hereby incorporated by reference in its entirety. Those techniques include various methods for retrieving and/or extracting information from paper documents, pdf files, images, and other documents.

The product conversion system 250 is adapted to convert the products (e.g., insurance policies) in the legacy system to products in the integrated system. The product conversion system identifies terms, conditions, and other product rules of the legacy product and identifies corresponding product rules in the integrated system. The system can create new products in the integrated administration system based on the product rules of the legacy product.

The function conversion system 260 is adapted to transfer and/or migrate the functionality (including business functions, business rules, and calculation modules) from the legacy system to the integrated system.

The data definition conversion system 270 is adapted to incorporate and/or migrate the data definitions, data schemas, data structures, and/or data points used in the legacy system to the integrated system.

The data modeling system 280 includes one or more systems that work together to train or otherwise create (for types of models that do not require training (e.g., kNN)) prediction models. The data modeling system may be adapted to create any type of model, including but not limited to, classification models, regression models, Markov chains, time series models, state space models, Bayesian models, boosted decision trees, neural networks, convolutional neural networks, recurrent neural networks, LSTM neural networks, or any other appropriate model, or combinations or ensembles thereof. To train a model, the model creation system will generally use a set of historical data, including input variables and a target. Multiple models with different hyperparameters may be created and evaluated to select a preferred model. In one embodiment, a hyperparameter autotuning system may be used to create, test, and select preferred models. The data modeling system may also include systems adapted for cleaning, segmenting, processing, and/or aggregating data for use in training the models; systems adapted to extract features from unstructured data, such as written text, images, video, recorded audio, etc.; systems adapted to update and/or retrain models; and systems adapted to reduce the number of variables in a data set.

The data modeling system may be used to generate missing data in the integrated system. For example, if a legacy system is missing data that the integrated system requires, a data model may be trained to generate the missing data.

Figure 3:
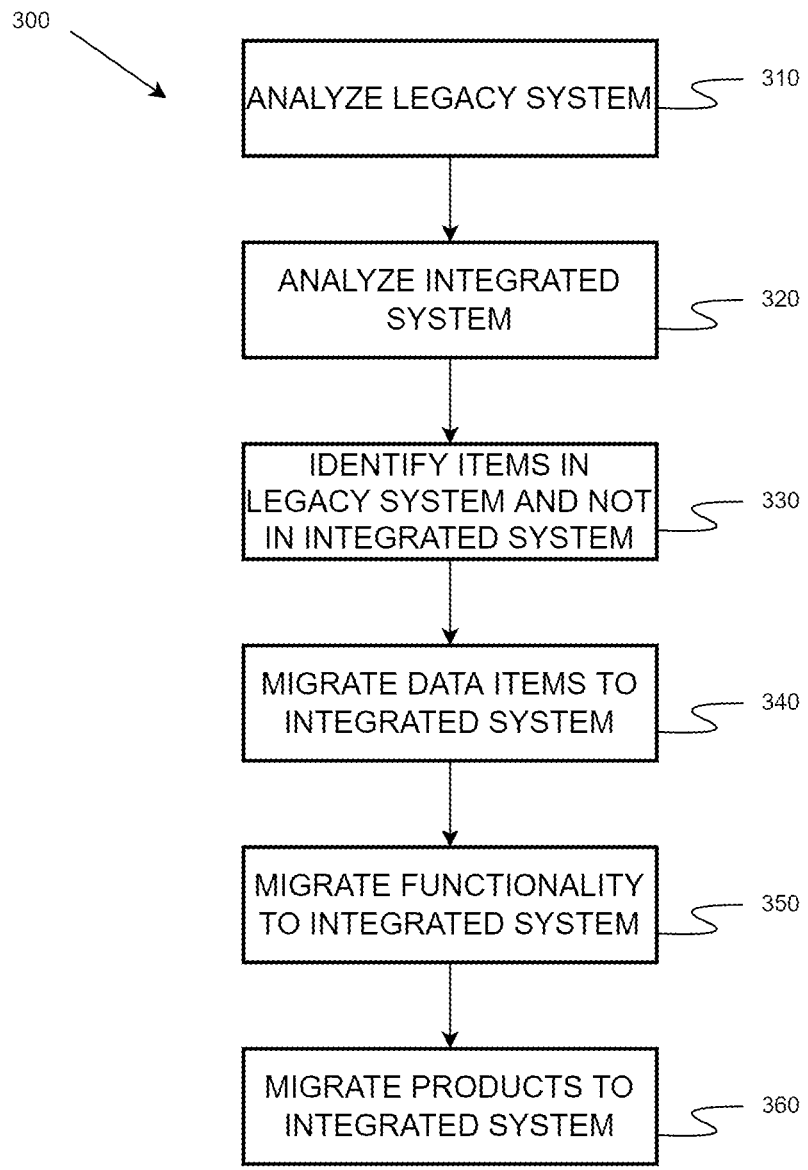
FIG. 3 illustrates an example method for incorporating functionalities, products, and data elements of a legacy administrative system into an integrated administrative system.

FIG. 3 illustrates an example method 300 for incorporating a legacy system 220 into an integrated system 230. In step 310, the legacy system is analyzed (e.g., by analysis system 240) to determine its specifications, including the system configuration, workflow, data structures, data definitions, calculation modules, product rules, business functions, products, etc. If the legacy system is a PAS, the plan codes of the legacy system are also analyzed.

The data sources analyzed to determine the specifications of the legacy PAS system include system architecture documents, system manuals, source code, data dictionaries, transaction data, policy data documents, and product data documents.

System architecture documents and system manuals may include detailed lists and descriptions of system functionality for all products. If available, they are a reliable source of required functionality and data items.

Source code is another reliable source, and may be analyzed using AI techniques to determine legacy PAS functionality, their usage, and their associated input and output fields.

Data dictionaries contain descriptions of data fields, and can be used determine the semantic content of data items. Data dictionaries may also be used to determine the similarity between data fields in the legacy PAS and data fields in the virtual PAS.

Transaction data, including batch job scripts and historical transaction data, includes historical records of functions that have been executed on the legacy PAS system. However, transaction data is limited to the data fields actually saved, and may not be stored for all functions, so may be limited in its usefulness.

Policy and product data can include actual data regarding policies and products in the system and is generally reliable.

All of these data sources, and others as applicable, may be analyzed to determine the relevant products and policies to be migrated to the legacy system, and any functionality and/or data items required by these products and policies. The IR/IE techniques disclosed in U.S. patent application Ser. No. 17/491,361 may be used as needed to retrieve or extract information from these data sources.

In an embodiment, items required by the legacy system are determined by analyzing the product and policies in the legacy system to determine business functions, data points (including inputs and outputs associated with the business functions), and other items required by each product or policy.

In step 320, the specifications of the integrated system, including the system configuration, workflow, data structures, data definitions, calculation modules, product rules, business functions, products, etc., are determined, either through analysis using analysis system 240 (as described above), or by retrieving the configuration from a stored configuration based on a prior analysis.

In step 330, items present in and/or required by products in the legacy system but not the integrated system are identified by analysis system 240. Data structures, data definitions, data points, calculation modules, product rules, business functions, and products that are present in the legacy system and/or required by products in the legacy system, but are not implemented in the integrated system, are identified. Various AI techniques may be used to determine correspondence between items in the legacy system and items in the integrated system, as further described below.

In step 340, data items that are present in and/or required by products in the legacy system but not present in the integrated system are created in the integrated system. For example, data structures, data definitions, and data points that are required by products in the legacy system, but do not exist in the integrated system, are created in the integrated system. This may be performed by data definition conversion system 270. Data that is required by the integrated system but missing in the legacy system may be generated using a ML model trained to generate such data. This model is created by data modeling system 280.

In step 350, functionality items that are present in and/or required by products in the legacy system but not present in the integrated system are created in the integrated system. For example, business functions and calculation modules that are required by products in the legacy system, but do not exist in the integrated system, will be created in the integrated system. This may be performed by function conversion system 260.

In step 360, products that are present in the legacy system but not present in the integrated system are created in the integrated system. Product rules that exist in the legacy system, but not the integrated system, are also created in the integrated system. This may be performed by product conversion system 250.

Figure 4:
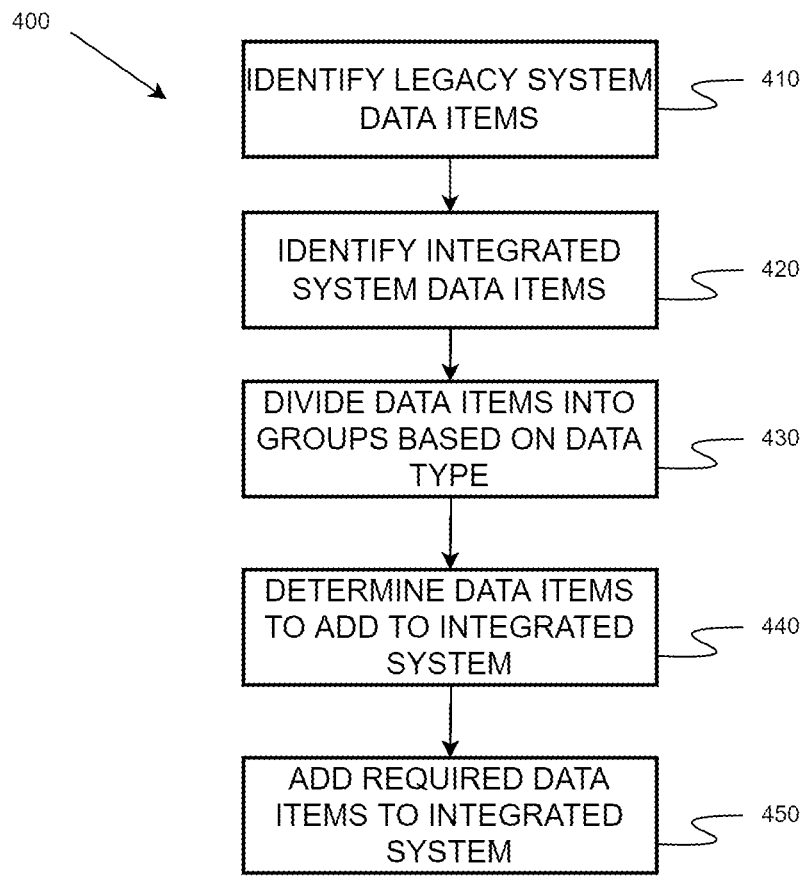
FIG. 4 illustrates one example of a method for incorporating a data definition from a legacy system into an integrated system.

FIG. 4 illustrates an example of a method 400 for identifying data items, such as data definitions, data structures, and data points, in the integrated system 230 corresponding to required data items in the legacy system 220. In general, data definitions and data structures are templates for the storage of actual data and include one or more data fields. For example, a customer data definition may include data fields relating to each customer, e.g., personal information, financial information, asset information, etc.

In step 410, data descriptions and data types for data items in the legacy system are identified, e.g., by analysis system 240. For example, data item descriptions may be extracted from one or more data sources.

In step 420, data descriptions and data types for data items in the integrated system are identified, e.g., by analysis system 240.

In step 430, the data items are divided into groups with similar or identical data types.

In step 440, the analysis system determines data items that are present in the legacy system but not in the integrated system using one or more AI techniques. In an embodiment, the data descriptions are analyzed using NLP techniques to identify data items in the legacy system that match data items in the integrated system. For example, word/phrase embeddings, language models, and/or similarity matrices may be used to identify similarities between the data fields of the systems.

For example, the description of each data item in the legacy system may be compared with the description of each data item in the integrated system of the same or similar data type to find the best match. The data descriptions in both systems may be extracted from the data sources and cleaned as necessary. The descriptions may then be tokenized by removing stop words and retaining core (stem) information of the descriptions. Then the tokenized and stemmed descriptions may be vectorized (i.e., converted to a set of vectors) by a vectorization process such as Doc2Vec. Finally, for each vectorized data item description in the legacy system, a similarity calculation (e.g., cosine similarity) can be applied as compared to each vectorized data item description in the integrated system. The comparison with the highest similarity score is then selected as the match for each legacy data item if the highest similarity score is greater than a predefined threshold. If there is no similarity score higher than the threshold, the legacy data item is considered to not be present in the integrated system and is added to the integrated system in a later step.

In step 450, data items corresponding to the missing data items are added to the integrated system. Data item descriptions can be copied from the legacy system if this is the first legacy system to be migrated to the integrated system. For each additional legacy system that is migrated, the existing data item description in the integrated system can be modified to account for the data item descriptions in the subsequently migrated legacy systems.

Figure 5:
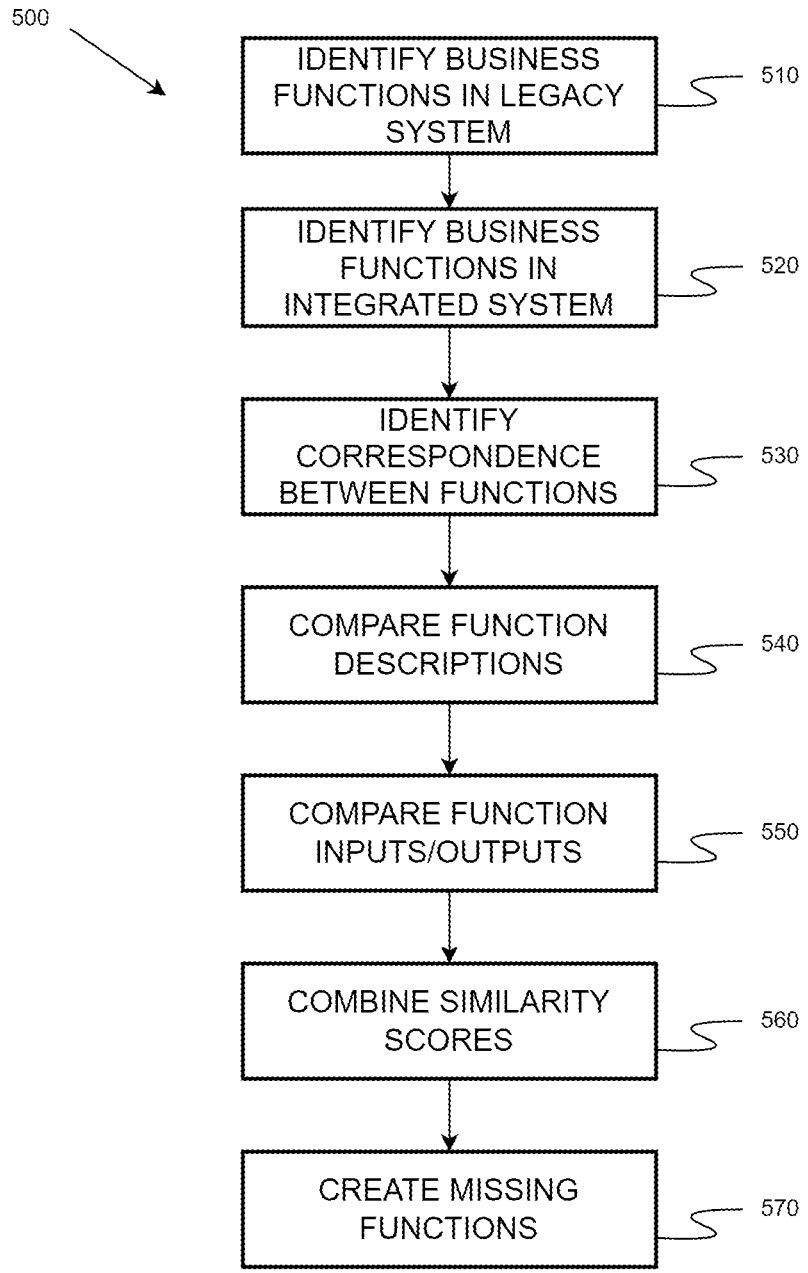
FIG. 5 illustrates one example of a method for incorporating a business function into an integrated system.

FIG. 5 illustrates one example of a method 500 for creating business functions or processes in the integrated system 230 based on business functions or process in the legacy system 220. In step 510, the business processes/functions of the legacy system, such as product alternation processes, customer communication processes, product pricing engines, etc., are identified, e.g., by analysis system 240.

In step 520, the business processes/functions in the integrated system are identified, e.g., by analysis system 240.

In step 530, processes in the integrated system that correspond to processes in the legacy system are identified using AI techniques, such as NLP.

For example, function descriptions in the legacy system may be compared with function descriptions in the integrated system to create a description similarity score in step 540. The function descriptions in both systems may be extracted from the data sources and cleaned as necessary. The descriptions may then be tokenized by removing stop words and retaining core (stem) information of the descriptions. Then the tokenized and stemmed descriptions may be vectorized (i.e., converted to a set of vectors) by a vectorization process such as Doc2Vec. Finally, for each vectorized function description in the legacy system, a similarity score (e.g., cosine similarity) can be generated with respect to each vectorized function description in the integrated system.

Data inputs and outputs for functions in the legacy system may be compared with data inputs and outputs for functions in the integrated system in step 550. Based on the comparison, a data similarity score may be created for each pair of functions. This similarity score may be based on the matching of data items from method 400.

In step 560, the similarity scores are combined (e.g., through addition, multiplication, scaling, or other methods of combining) and the function in the integrated system with the highest combined similarity score is then selected as the corresponding function for each legacy function if the highest combined similarity score is greater than a predefined threshold. If there is no similarity score higher than the threshold, the legacy function is considered to not be present in the integrated system and is added to the integrated system in the next step.

In step 570, all missing business functions/processes in the legacy system are created in the integrated system, including any required business rules and data items.

Figure 6:
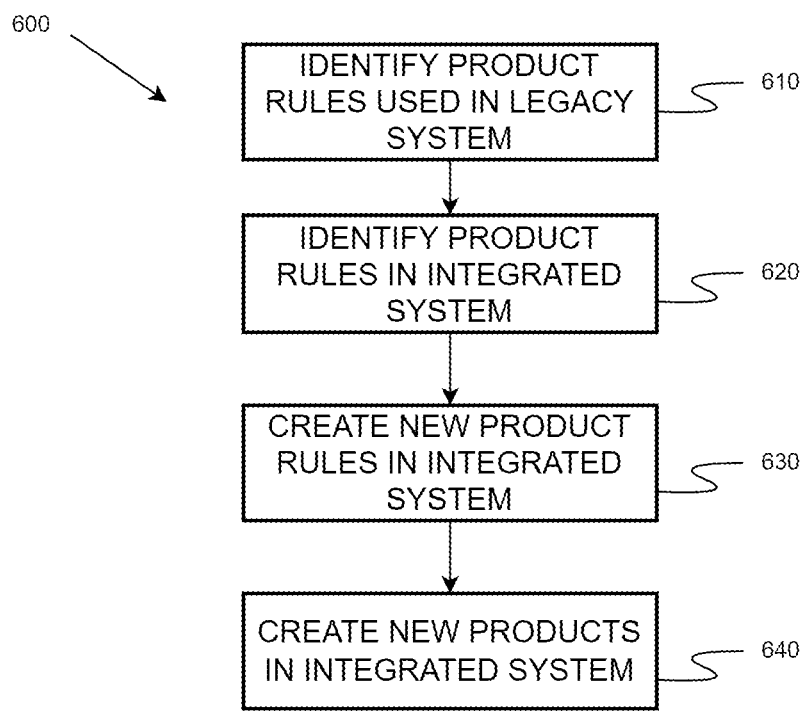
FIG. 6 illustrates one example of a method for incorporating a product into an integrated system.

FIG. 6 illustrates one example of a method 600 for creating new products in the integrated system 230 based on products in the legacy system 220. In an embodiment, the method creates products in the integrated system with identical product rules and premium amount as the products in the legacy system. In an embodiment, for products in the legacy system with no current policyholders no new product in the integrated system will be created.

In step 610, product terms, product conditions, and other product rules of the legacy products are identified, e.g., by analysis system 240. In addition, the premium amount of each legacy product is calculated and/or otherwise identified (e.g., if it is stored in the legacy system). Where policy documents are available, natural language processing (NLP) or other AI techniques (e.g., as disclosed in U.S. patent application Ser. No. 17/491,361) may be used to identify rules (including, e.g., product terms, product conditions, and other product rules), calculation methodologies, premium amounts, etc., from the available policy document(s) that relate to the products.

In step 620, product rules (e.g., terms, conditions, etc.) in the integrated system that correspond to the product rules identified in the prior step are identified, e.g., by analysis system 240. Correspondence between product rules may be determined used AI techniques, such as NLP.

For example, product rule text or product rule descriptions in the legacy system may be compared with product rule text or descriptions in the integrated system to create similarity scores. The rule text and/or rule descriptions in both systems may extracted from the data sources and cleaned as necessary. The text and/or descriptions may then be tokenized by removing stop words and retaining core (stem) information of the descriptions. Then the tokenized and stemmed text and/or descriptions may be vectorized (i.e., converted to a set of vectors) by a vectorization process such as Doc2Vec. Finally, for each vectorized text and/or description in the legacy system, a similarity score (e.g., cosine similarity) can be generated with respect to each vectorized rule and/or description in the integrated system.

In step 630, if any required product rules are not present in the integrated system, they are created in the integrated system.

In step 640, for each product in the legacy system, a corresponding new product is created in the integrated system with the corresponding product rules as identified in step 620. The premium of the new product created in the integrated system is also ensured to be identical to the premium of the legacy product.

Figure 7:
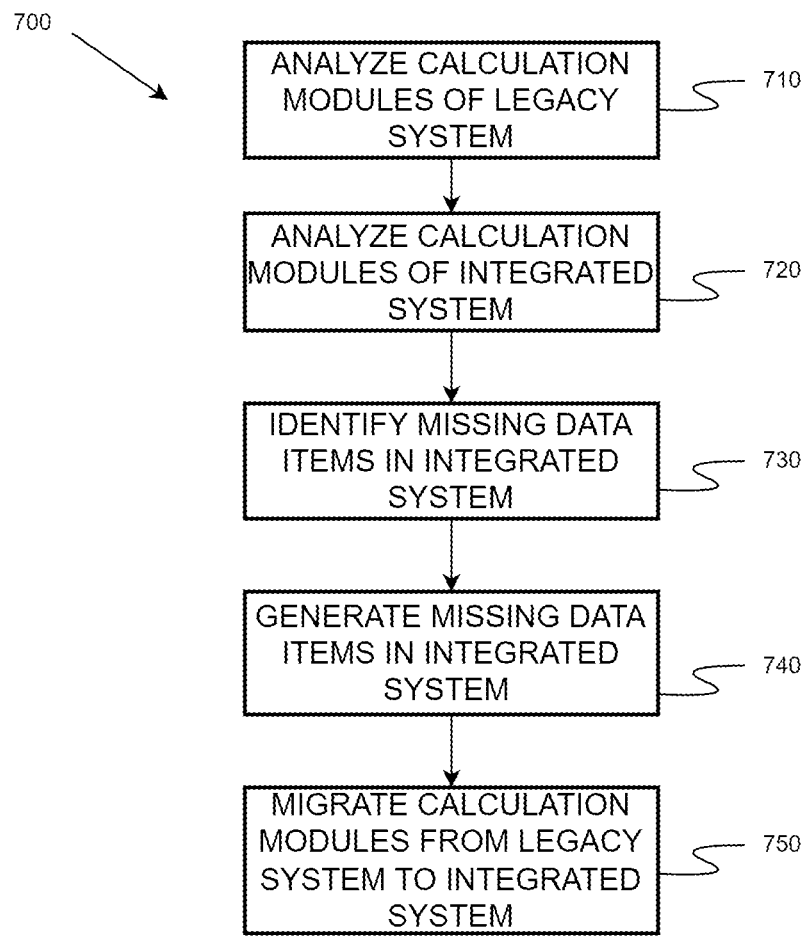
FIG. 7 illustrates one example of a method for incorporating a calculation module into an integrated system.

FIG. 7 illustrates one example of a method 700 for creating new calculation modules in the integrated system 230 based on calculation modules in the legacy system 220. In step 710, the calculation modules of the legacy system are analyzed to identify required inputs and outputs for each calculation module, e.g., by analysis system 240. In general, the inputs and outputs will be data points from a data structure in the legacy system.

In step 720, the calculation modules of the integrated system are analyzed to determine which of the legacy system calculation modules already exist in the integrated system. This analysis may be performed by analysis system 240 and correspondence between calculation modules in the legacy system and calculation modules in the integrated system may be determined using AI techniques similar to those described above, e.g., by using NLP techniques on the calculation module descriptions to find the most similar calculation module in the integrated system for each calculation module in the legacy system. For a given calculation module in the legacy system, if none of the similarity scores of calculation modules in the integrated system are above a predefined threshold, then that calculation module is determined to not exist in the integrated system.

In step 730, for each legacy system calculation module that does not exist in the integrated system, data points that are required by that calculation module but do not exist in the integrated system are identified using techniques identical or similar to those described with respect to FIG. 4.

In step 740, any missing data points identified in the prior step are generated in the integrated system.

In step 750, the missing calculation modules are generated in the integrated system based on business rules as described herein.

After the data items, functionality, and products from the legacy systems are implemented into the integrated system, data may be migrated from the legacy system to the integrated system. If data for a field required by the integrated system is missing from the legacy system, data models may be trained and used to populate the missing data.

Figure 8:
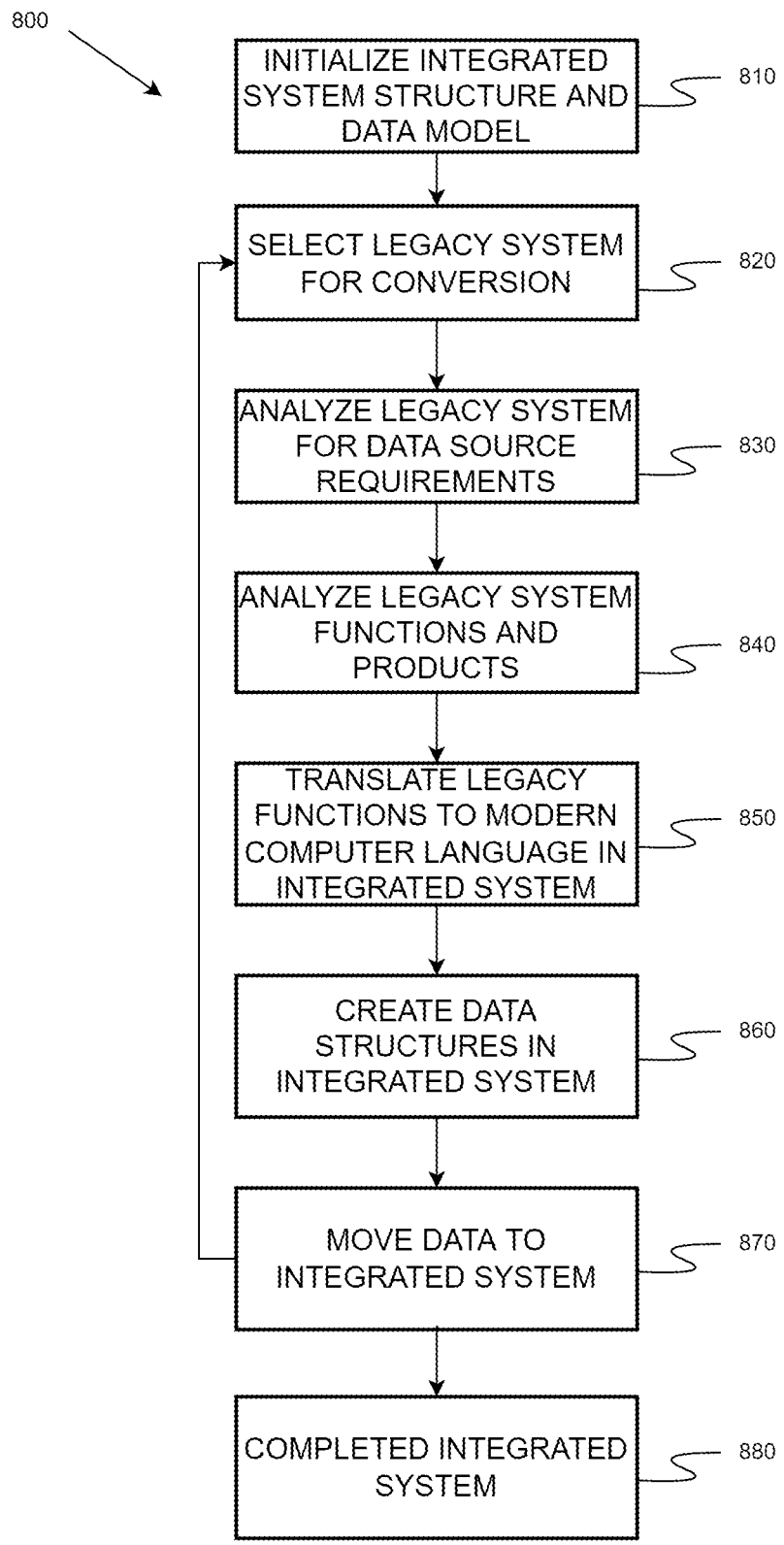
FIG. 8 illustrates another example method for the creation of an integrated administration system.

FIG. 8 illustrates another example method—a knowledge-based process—for creating an integrated administration system from one or more legacy systems. In step 810, the initial structure and data model for the integrated administration system is created. This may include predefined templates for functions, processes, products, product rules, data items, and other elements.

In step 820, a legacy administration system is selected for conversion. The selected system may be an existing administrative system, e.g., ALIS, InsPro, DXC Cyberlife, DXC Graphtalk, DXC Ingenium, iWorks, etc.

In step 830, the data sources of the legacy system are analyzed to determine if the system meets data source requirements. Data sources include document that describe the system, and include system architecture documents, system manuals, source code, data dictionaries, transaction data, policy data documents, product data documents, and others. The legacy system data sources should have information about its functionality, processes, and products, as well as a data dictionary. These data source requirements are helpful for building a fully functional integrated system.

In step 840, the legacy system (and its data sources) is analyzed to determine its functionalities (including business functions, business rules, calculation modules, etc.), its products, and its data items.

In step 850, all functionalities are recreated in the integrated system using a modern computer language. To the extent possible, this may be accomplished automatically, using applicable AI, RPA, and graphic methods. All products and/or policies are migrated as well.

In step 860, the data structures and data points from the legacy system are created in the integrated system.

In step 870, data from the legacy system is migrated to the new data structures in the integrated system.

The method then loops to step 820 to select another legacy system for implementation into the integrated system, if any are remaining. If not, the method ends. The resulting integrated administration system 880 includes the siloed legacy systems, and is adaptive to various needs, extensible through the addition of new functionalities and data definitions, scalable, and secure.

Conversion or migration of products, data definitions, and/or functionalities from the legacy system to the integrated system may accomplished in various ways, and the present invention is not limited to the methods explicitly disclosed herein. For example, functionalities may be converted individually, in groups, or all at once in parallel. Required data points may be created in the integrated system as each functionality is processed, or several functionalities may be analyzed in a group, and all required data points for the group created prior to converting the functionalities themselves. Similarly, required product rules may be created in the integrated system as each product is processed, or several products may be analyzed in a group, and all required product rules for the group created prior to converting the products themselves. One of ordinary skill in the art will recognize additional variations of the disclosed methods.

Historical data used to train used AI models to generate missing data may first be cleaned, joined, segmented, aggregated, and/or feature engineered, as necessary. Cleaning the data involves, e.g., standardizing data types and values, removing duplicated variables, removing variables with a unique value, removing obviously non-predictive variables (e.g., user id, etc.), etc.

Joining data involves collecting related data together via a common key, so data for relevant real world entities (e.g., policyholders, claimants, etc.), events (e.g., claims), etc., are associated.

Segmenting data relates to dividing the data into groups based on a common characteristic, e.g., geographic area, age, etc. Such groups are preferably segmented based on a characteristic that is more deterministic with respect to the target of the model than other characteristics.

To the extent necessary, data is aggregated to a desired granularity. The appropriate granularity will depend on the type and structure of the input variables, the target, the quantity and volatility of the input variables, and other factors.

Data to be used in training models may be extracted from unstructured data sources, e.g., text, images, videos, audio recordings, etc. For example, for unstructured text sources, the extracted features may be related to the sentiment of the text (e.g., using sentiment analysis), topics discussed in the text (e.g., using topic modeling), presence of keywords, context analysis, and other types of natural language processing or textual analysis. For images, the extracted features may be related to foreground objects, background objects, features in an embedded image space, etc. For audio recordings, the extracted features may be related to sentiment (e.g., using tonal analysis), etc.

In some embodiments, the number of potential input variables may number in the thousands, and it would be impractical to train AI models using all of the variables. In such embodiments, feature engineering techniques may be used to reduce the number of variables. For example, variables with incomplete or sparse data, variables with low variance, highly correlated variables, and noisy variables may be removed from the dataset.

To further reduce the number of variables, the relative contribution of each of the variables in the data set in predicting the target value may be calculated, and only the variables with the most influence may be kept in the dataset.

After the dataset is prepared and tagged, the AI model may be trained. A hyperparameter autotuning engine may be used to tune the hyperparameters of the AI models. The number and type of hyperparameters depend on the type of model. For multi-layer perceptron (MLP) models, hyperparameters include numbers of layers, size of layers, number of nodes, number of hidden units, activation function, learning rate, momentum, etc. In one embodiment, the hyperparameter autotuning engine may comprise multiple GPUs that generate many variations of a model, each with different hyperparameters. The variations may then be tested or evaluated to determine the best or most acceptable model.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a non-transitory medium for execution by a data processing apparatus. The computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application." a "module," a "software module," a "script." or simply as "code." A computer program may be written in any programming language, and it can be deployed in any form, including as a standalone program or as a module, component, subroutine, or other unit suitable for use in a computing environment. A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM").

Computer readable media suitable for storing computer program instructions and data include all forms of nonvolatile memory, media, and memory devices. For example, computer readable media may include one or more of the following: semiconductor memory devices, such as ROM or RAM; flash memory devices; magnetic disks; magneto optical disks; and/or CD-ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors, and/or organic light-emitting diode ("OLED") monitors. The computer may further comprise one or more input devices by which the user can provide input to the computer. Input devices may comprise one or more of: keyboards, pointing devices (e.g., mice, trackballs, etc.), and/or touch screens. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a back-end component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A processor-implemented method for implementing a legacy administration system into an integrated administration system, the method comprising:
    analyzing the legacy system using a processor-implemented analysis system to determine its components, including but not limited to, data items, product rules, business functions or processes, and calculation modules;
    identifying, using one or more processors, at least one data item required by the legacy system not present in the integrated system using one or more AI techniques;
    implementing, using one or more processors, the identified data item into the integrated system;
    identifying, using one or more processors, at least one functionality required by the legacy system and not present in the integrated system using one or more AI techniques; and
    implementing, using one or more processors, the identified functionality into the integrated system.

2. The method of claim 1, further comprising implementing, using one or more processors, a product from the legacy system into the integrated system, wherein the product is not present in the integrated system prior to its implementation into the integrated system.

3. The method of claim 2, wherein implementing the product into the integrated system comprises:
    identifying at least product rule or condition comprising the product in the legacy system;

identifying at least one corresponding rule or condition in the integrated system based on the at least one legacy product rule or condition; and creating a product in the integrated system based on the at least one corresponding rule or condition.

4. The method of claim 1, further comprising implementing, using one or more processors, a business process from the legacy system into the integrated system, wherein the business process is not present in the integrated system prior to its implementation into the integrated system.

5. The method of claim 4, wherein implementing the business process into the integrated system comprises:

identifying at least one rule used in the business process in the legacy system;

identifying at least one corresponding rule in the integrated system based on the at least one legacy rule; and creating a business process in the integrated system based on the at least one corresponding rule.

6. The method of claim 1, further comprising implementing, using one or more processors, a calculation module from the legacy system into the integrated system, wherein the calculation module is not present in the integrated system prior to its implementation into the integrated system.

7. The method of claim 6, wherein implementing the calculation module comprises identifying an item required by the calculation module not present in the integrated system.

8. The method of claim 7, wherein implementing the calculation module further comprises generating the not present item using at least one business rule.

9. The method of claim 1, wherein the one or more AI techniques used to identify at least one data item required by the legacy system not present in the integrated system comprises a natural language processing (NLP) technique.

10. The method of claim 1, wherein the one or more AI techniques used to identify at least one functionality required by the legacy system not present in the integrated system comprises a natural language processing (NLP) technique.

11. A system for creation of an integrated administration system, the system comprising:

a processor-implemented analysis system adapted to analyze an administrative system to determine its components, including but not limited to, data definitions, product rules, business processes, and calculation modules;

a processor-implemented product conversion system adapted to convert at least one product from a legacy administrative system to a virtual administrative system;

a processor-implemented data definition conversion system adapted to convert at least one data definition in the legacy administrative system to the virtual administrative system in accordance with the data definitions of the integrated system; and a processor-implemented function conversion system adapted to convert at least one functionality in the legacy administrative system to the virtual administrative system.

12. The system of claim 11, wherein the product conversion system is configured to:

identify at least product rule or condition comprising the at least one product in the legacy system;

identify at least one corresponding rule or condition in the integrated system based on the at least one legacy product rule or condition; and create at least one product in the integrated system based on the at least one corresponding rule or condition.

13. The system of claim 11, wherein the function conversion system is configured to convert at least one business process from the legacy system to the integrated system.

14. The system of claim 13, wherein the function conversion system is configured to:

identify at least one rule used in the at least one business process in the legacy system;

identify at least one corresponding rule in the integrated system based on the at least one legacy rule; and create a business process in the integrated system based on the at least one corresponding rule.

15. The system of claim 11, wherein the function conversion system is configured to convert at least one calculation module of the legacy system to the integrated system.

16. The system of claim 15, wherein the function conversion system is further configured to identify an item required by the calculation module not present in the integrated system.

17. The system of claim 16, wherein the function conversion system is further configured to generate the not present item using at least one business rule.

18. The system of claim 11, wherein the analysis system is further adapted to identify items present in the legacy system and not present in the integrated system using at least one AI technique.

19. The system of claim 18, wherein the AI technique comprises an NLP technique.

20. A processor-implemented method for creating an integrated administration system from more than one legacy administration system, the method comprising:

for each legacy system: analyzing the legacy system using a processor-implemented analysis system to determine its components, including but not limited to, data items, products, product rules, business functions or processes, and calculation modules;

implementing, using one or more processors, all identified functionality, including business functions, business processes, and calculation modules, into the integrated system;

implementing, using one or more processors, all identified products and product rules into the integrated system; and migrating, using one or more processors, all identified data items to the integrated system;

wherein the final integrated administration system comprises at least two siloed migrated legacy systems.

* * * * *